(12) United States Patent
Hiratani et al.

(10) Patent No.: US 8,993,696 B2
(45) Date of Patent: Mar. 31, 2015

(54) METHOD FOR PRODUCING POLYMER PARTICLES

(75) Inventors: Takayuki Hiratani, Tokyo (JP); Shinnosuke Koji, Yokohama (JP); Kazumichi Nakahama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 132 days.

(21) Appl. No.: 13/453,196

(22) Filed: Apr. 23, 2012

(65) Prior Publication Data
US 2012/0277390 A1 Nov. 1, 2012

(30) Foreign Application Priority Data

Apr. 27, 2011 (JP) ................. 2011-099342
Nov. 16, 2011 (JP) ................. 2011-250856

(51) Int. Cl.
| C08F 4/04 | (2006.01) |
| C08F 2/18 | (2006.01) |
| C08F 2/38 | (2006.01) |
| C08F 112/08 | (2006.01) |
| C08F 120/14 | (2006.01) |
| C08F 212/08 | (2006.01) |
| C08F 220/14 | (2006.01) |

(52) U.S. Cl.
CPC ... *C08F 2/18* (2013.01); *C08F 2/38* (2013.01); *C08F 112/08* (2013.01); *C08F 120/14* (2013.01); *C08F 212/08* (2013.01); *C08F 220/14* (2013.01)
USPC .................... 526/219.6; 526/218.1

(58) Field of Classification Search
USPC .......................... 526/219.6, 218.1
See application file for complete search history.

(56) References Cited

U.S. PATENT DOCUMENTS 5,274,057 A * 12/1993 Georges et al. ............... 526/202
5,750,303 A 5/1998 Inaba et al.

FOREIGN PATENT DOCUMENTS

JP 3332721 B2 10/2002
JP 2006-221203 A 8/2006

OTHER PUBLICATIONS

Adam Limer,Alex Heming,Ian Shirley,David Haddleton), "Living radical polymerisation in heterogeneous conditions-suspension polymerisation", European Polymer Journal, 2005,vol. 41,p. 805-816.
John D.Biasutti,Thomas P. Davis, Frank P. Lucien, Johan P.A. Heuts, "Reversible Addition-Fragmentation Chain Transfer Polymerization of Methyl Methacrylate in Suspension" Journal of Polymer Science:Part A:Polymer Chemistry, 2005,vol. 43,2001-2012.
Patrick Lacroix-Desmazes, Romain Severac,and Bernard Boutevin, "Reverse Iodine Transfer Polymerization of Methyl Acrylate and n-Butyl Acrylate" Macromolecules, 2005,vol. 38,p. 6299-6309.
Jeff Tonnar, Patrick Lacroix-Desmazes,and Bernard Boutevin, "Controlled Radical Polymerization of Styrene by Reverse Iodine Transfer Polymerization (RITP) in Miniemulsion: Use of Hydrogen Peroxide as Oxidant" Macromolecules, 2007,vol. 40,p. 186-190.

* cited by examiner

*Primary Examiner* — Robert D. Harlan
(74) *Attorney, Agent, or Firm* — Canon U.S.A., Inc. IP Division

(57) ABSTRACT

A method for producing polymer particles includes a suspension step of suspending a first liquid mixture containing an oily olefin monomer, a radical polymerization initiator, and an iodine molecule in a second liquid mixture containing water and an iodide ion to prepare a suspension containing an oil droplet having the first liquid mixture; a synthesis step of synthesizing an iodine compound by allowing a radical generated by cleavage of the radical polymerization initiator to react with the iodine molecule in the oil droplet; and a polymerization step of polymerizing the oily olefin monomer in the oil droplet.

6 Claims, 5 Drawing Sheets

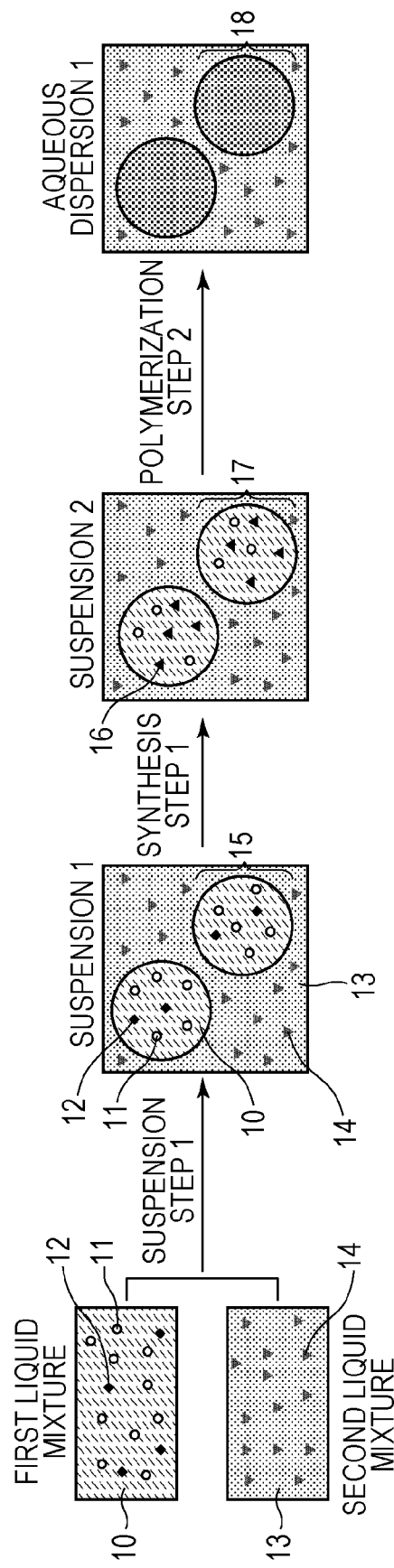

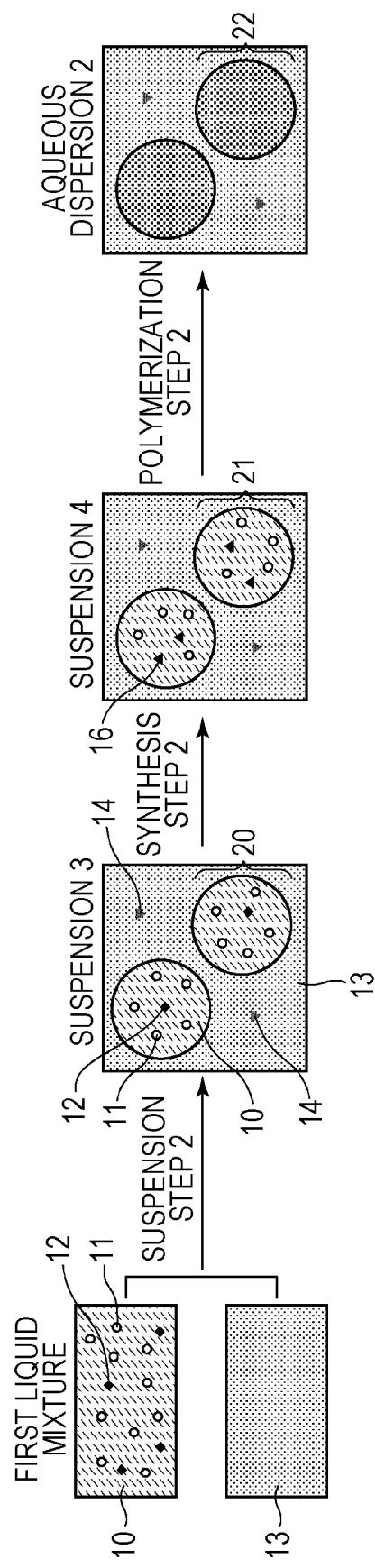

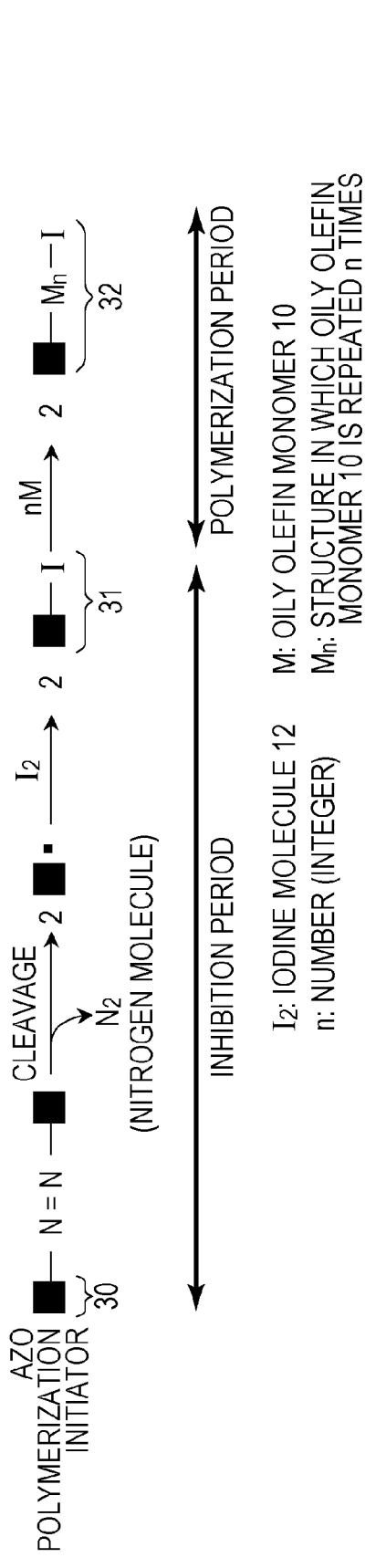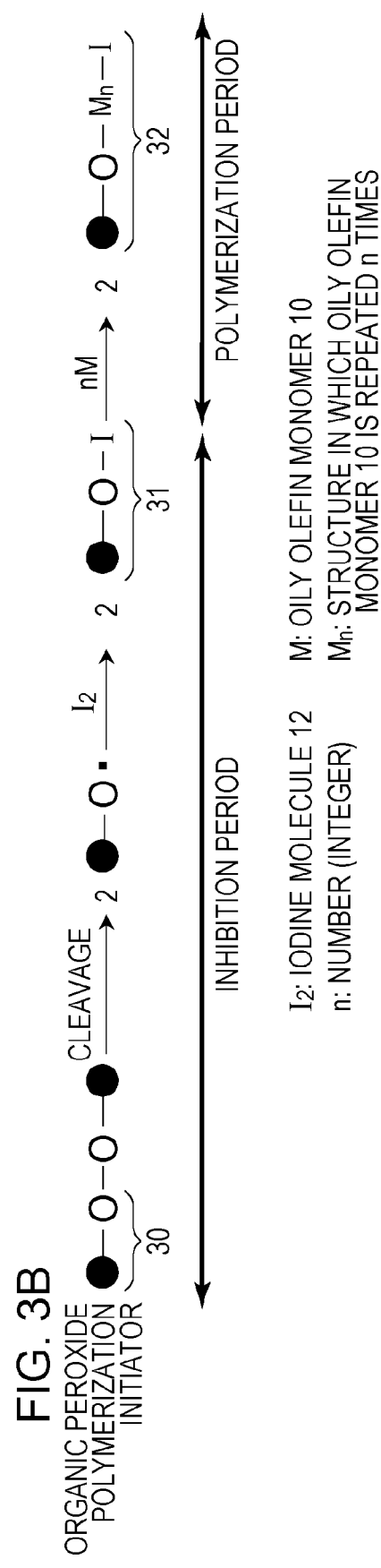

US 8,993,696 B2

METHOD FOR PRODUCING POLYMER PARTICLES

BACKGROUND OF THE INVENTION

1. Field of the Invention

The present invention relates to a method for producing polymer particles.

2. Description of the Related Art

Polymer particles are produced by various polymerization methods such as suspension polymerization, emulsion polymerization, and precipitation polymerization. Among these polymerization methods, suspension polymerization is industrially widely used as, for example, a method for producing a polymerized toner because a functional substance such as a coloring material can be easily included in polymer particles.

Recently, the area of study regarding a technique for controlling the molecular weight of polymer particles has been activated. For example, a method has been reported in which living radical polymerization such as atom transfer radical polymerization or reversible addition-fragmentation chain transfer polymerization is combined with suspension polymerization (Adam Limer, Alex Heming, Ian Shirley, and David Haddleton, European Polymer Journal, 2005, Vol. 41, pp. 805-816 (Non-Patent Literature 1), and John D. Biasutti, Thomas P. Davis, Frank P. Lucien, and Johan P. A. Heuts, Journal of Polymer Science: Part A: Polymer Chemistry, 2005, Vol. 43, pp. 2001-2012 (Non-Patent Literature 2)). However, from the standpoint of problems of, for example, a remaining catalyst, safety and sanitation, and the cost, at present, it is difficult to industrially use many of such living radical polymerization methods.

A method in which a polymerization control agent such as a chain transfer agent or a polymerization inhibitor is used is known as a method for industrially controlling the molecular weight of polymer particles. However, a significant difference in the molecular weight may be caused or the polymerization conversion rate may be significantly decreased depending on a slight difference in the amount of polymerization control agent used (Japanese Patent No. 3332721 (corresponding U.S. Pat. No. 5,750,303) (Patent Literature 1) and Japanese Patent Laid-Open No. 2006-221203 (no corresponding foreign application) (Patent Literature 2)). Although the molecular weight can also be controlled by changing the amount of polymerization initiator or the polymerization temperature, such a method has many problems in terms of the cost and safety for the purpose of obtaining polymer particles having a low molecular weight, for example.

As a method capable of easily controlling the molecular weight at a low cost, Patrick Lacroix-Desmazes, Romain Severac, and Bernard Boutevin, Macromolecules, 2005, Vol. 38, pp. 6299-6309 (Non-Patent Literature 3) discloses reverse iodine transfer polymerization.

Furthermore, Jeff Tonner, Patrick Lacroix-Desmazes, and Bernard Boutevin, Macromolecules, 2007, Vol. 40, pp. 186-190 (Non-Patent Literature 4) discloses that, in a process of producing polymer particles, the process being performed by using suspension polymerization and reverse iodine transfer polymerization in combination, satisfactory molecular-weight controllability and a satisfactory polymerization conversion rate can be achieved by adding hydrogen peroxide and hydrochloric acid to an aqueous phase.

SUMMARY OF THE INVENTION

Aspects of the present invention provide a method for producing polymer particles, the method being performed by using suspension polymerization and reverse iodine transfer polymerization in combination, in which both satisfactory molecular-weight controllability and a satisfactory polymerization conversion rate can be achieved.

A method for producing polymer particles according to an aspect of the present invention includes a suspension step of suspending a first liquid mixture containing an oily olefin monomer, a radical polymerization initiator, and an iodine molecule in a second liquid mixture containing water and an iodide ion to prepare a suspension containing an oil droplet having the first liquid mixture; a synthesis step of synthesizing an iodine compound by allowing a radical generated by cleavage of the radical polymerization initiator to react with the iodine molecule in the oil droplet; and a polymerization step of polymerizing the oily olefin monomer in the oil droplet.

According to the aspect of the present invention, it is possible to provide a method for producing polymer particles, the method being performed by using suspension polymerization and reverse iodine transfer polymerization in combination, in which both satisfactory molecular-weight controllability and a satisfactory polymerization conversion rate can be achieved.

Further features of the present invention will become apparent from the following description of exemplary embodiments with reference to the attached drawings.

BRIEF DESCRIPTION OF THE DRAWINGS

FIG. 1 is a process drawing illustrating a method for producing polymer particles according to an embodiment of the present invention.

FIG. 2 is a process drawing illustrating a method for producing polymer particles in the related art.

FIGS. 3A and 3B are drawings each illustrating a production mechanism of an iodine compound in reverse iodine transfer polymerization.

DESCRIPTION OF THE EMBODIMENTS

The inventors of the present invention found that, in the case where reverse iodine transfer polymerization described in Non-Patent Literature 3 is combined with suspension polymerization, iodine molecules leak from an oil phase into an aqueous phase in the form of iodide ions and molecular-weight controllability is particularly significantly decreased.

In the method disclosed in Non-Patent Literature 4, oxygen generated by thermal decomposition of hydrogen peroxide inhibits a polymerization reaction, and therefore, the polymerization conversion rate is fundamentally insufficient. Furthermore, since this method is suspension polymerization under a strongly acidic condition, dispersion stability of polymer particles may be impaired.

A method for producing polymer particles according to aspects of the present invention includes a suspension step of suspending a first liquid mixture containing an oily olefin monomer, a radical polymerization initiator, and an iodine molecule in a second liquid mixture containing water and an iodide ion to prepare a suspension containing an oil droplet having the first liquid mixture; a synthesis step of synthesizing an iodine compound by allowing a radical generated by cleavage of the radical polymerization initiator to react with the iodine molecule in the oil droplet; and a polymerization step of polymerizing the oily olefin monomer in the oil droplet.

Figure 4:
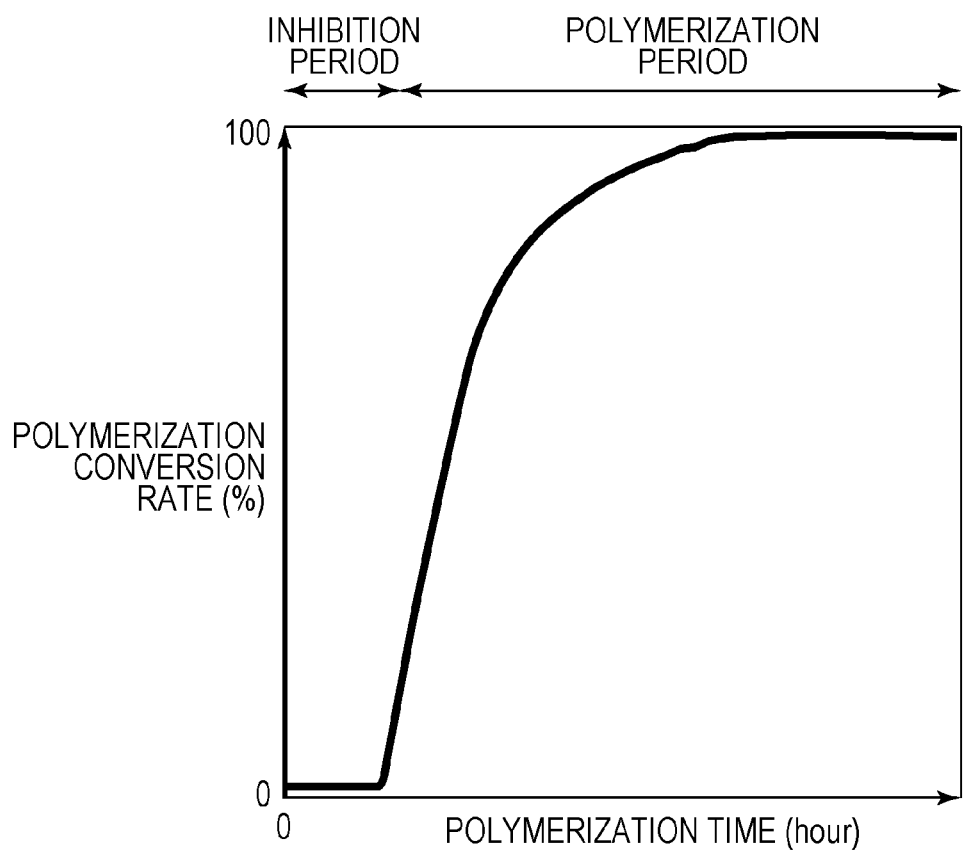
FIG. 4 is a graph that schematically shows a typical relationship between the polymerization conversion rate and the polymerization time in reverse iodine transfer polymerization.

The method for producing polymer particles according to aspects of the present invention is performed using reverse iodine transfer polymerization. First, reverse iodine transfer polymerization will be described. Reverse iodine transfer polymerization is living radical polymerization characterized by using iodine molecules (chemical formula: $I_2$) as described in Non-Patent Literature 3. FIG. 4 schematically shows a typical relationship between the polymerization conversion rate and the polymerization time in reverse iodine transfer polymerization. A polymerization reaction in reverse iodine transfer polymerization is divided into an inhibition period induced in the initial stage of the polymerization reaction and a polymerization period induced in the middle and late stages of the polymerization reaction. In the inhibition period, an iodine compound is produced by a reaction between a radical generated by cleavage of a radical polymerization initiator and an iodine molecule. In the polymerization period, a polymer compound is produced by a chain reaction of a monomer with intervention of the iodine compound and the radical polymerization initiator.

As shown in FIG. 4, reverse iodine transfer polymerization is characterized in that the polymerization conversion rate hardly changes during the inhibition period, and increases during the polymerization period with the increase in the polymerization time.

The molecular weight of a polymer compound obtained by ideal reverse iodine transfer polymerization (in the case where the polymerization conversion rate is 100%) depends on the amount of iodine molecules charged as represented by formula (1):

(Molecular weight)=[(Weight of monomer charged)/
{2×(The number of iodine molecules charged)
}]+(Mass number of residue of radical polymerization initiator)+(Mass number of iodine atom)   Formula (1)

The term "molecular weight of a polymer compound" and the term "molecular weight of polymer particles" used herein represent the same concept.

Next, a problem of a method for producing polymer particles, the method being performed by using reverse iodine transfer polymerization and suspension polymerization in combination, will now be described with reference to FIG. 2.

FIG. 2 is a process drawing illustrating a method for producing polymer particles in the related art. In FIG. 2, a first liquid mixture containing an oily olefin monomer 10, a radical polymerization initiator 11, and iodine molecules 12 is suspended in water 13 in a suspension step 2, thereby obtaining a suspension 3 in which oil droplets 20 composed of the first liquid mixture are dispersed in the water 13.

Next, in a synthesis step 2, the inhibition period of reverse iodine transfer polymerization occurs in the oil droplets 20, and radicals generated by cleavage of the radical polymerization initiator 11 and the iodine molecules 12 react with each other to produce an iodine compound 16, thus obtaining a suspension 4 in which oil droplets 21 containing the iodine compound 16 are dispersed in the water 13. Lastly, in a polymerization step 2, the polymerization period of reverse iodine transfer polymerization occurs in the oil droplets 21 to obtain an aqueous dispersion 2 in which polymer particles 22 are dispersed in the water 13. For the sake of convenience of description, the synthesis step 2 (inhibition period) and the polymerization step 2 (polymerization period) have been separately described. However, these steps are a continuous step in the actual experimental operation.

The inventors of the present invention believe that, in the method for producing polymer particles, the method being performed by using reverse iodine transfer polymerization and suspension polymerization in combination, the essence of the problem occurs mainly in the suspension step 2 in FIG. 2. Originally, the solubility of the iodine molecules 12 in the water 13 is relatively low (Solubility (25° C.): 0.34 g/100 g of water). However, the iodine molecules 12 dissolved in the water 13 through the interface between the oil droplets 20 and the water 13 are hydrolyzed by a large amount of water 13 present around the iodine molecules 12 and converted to iodide ions 14 (chemical formula: $I^-$). Specifically, the essence of the problem lies in that, when the first liquid mixture is suspended in the water 13 in the suspension step 2 to obtain the suspension 3 in which the oil droplets 20 composed of the first liquid mixture are dispersed in the water 13, some of the iodine molecules 12 are hydrolyzed and leak from the oil droplets 20 into the water 13 in the form of the iodide ions 14.

Referring to formula (I), the molecular weight in reverse iodine transfer polymerization depends on the amount of iodine molecules charged. Therefore, the leakage of the iodine molecules 12 in FIG. 2 inevitably degrades the molecular-weight controllability.

Next, a method for producing polymer particles according to aspects of the present invention will be described. According to aspects of the method for producing polymer particles of the present invention, the problem in the related art illustrated in FIG. 2 can be solved.

FIG. 1 is a process drawing illustrating a method for producing polymer particles according to an embodiment of the present invention. Referring to FIG. 1, in a suspension step 1, a first liquid mixture containing an oily olefin monomer 10, a radical polymerization initiator 11, and iodine molecules 12 is suspended in a second liquid mixture containing water 13 and iodide ions 14, thereby obtaining a suspension 1 in which oil droplets 15 composed of the first liquid mixture are dispersed in the water 13. Next, in a synthesis step 1, the inhibition period of reverse iodine transfer polymerization occurs in the oil droplets 15, and radicals generated by cleavage of the radical polymerization initiator 11 and the iodine molecules 12 react with each other to produce an iodine compound 16, thus obtaining a suspension 2 in which oil droplets 17 containing the iodine compound 16 are dispersed in the water 13. Lastly, in a polymerization step 1, the polymerization period of reverse iodine transfer polymerization occurs in the oil droplets 17, and the oily olefin monomer 10 is polymerized, thereby obtaining an aqueous dispersion 1 in which polymer particles 18 are dispersed in the water 13. For the sake of convenience of description, the synthesis step 1 (inhibition period) and the polymerization step 1 (polymerization period) have been separately described. However, these steps are a continuous step in the actual experimental operation.

A feature of the method for producing polymer particles according to aspects of the present invention lies in that, in the suspension step 1, the first liquid mixture is suspended in the second liquid mixture containing the iodide ions 14. The presence of the iodide ions 14 contained in the second liquid mixture can suppress the leakage of the iodine molecules 12 from the oil droplets 15 into the water 13 in the form of the iodide ions 14.

Figure 5A:
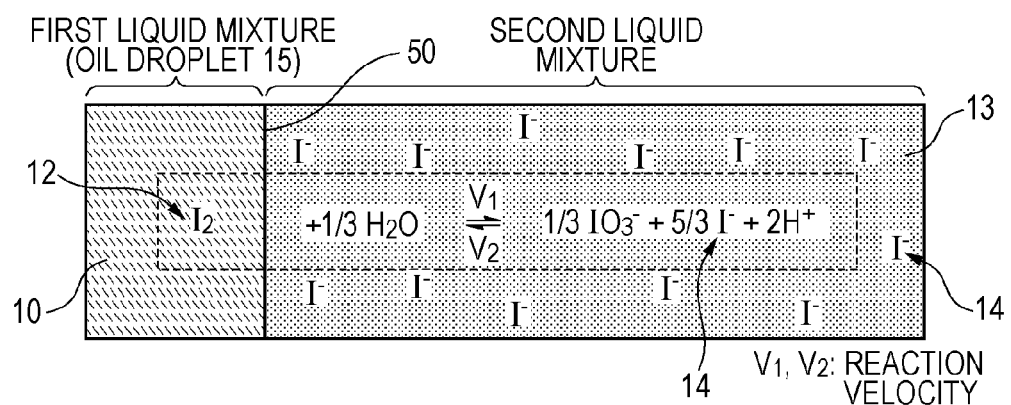
FIG. 5A is a drawing illustrating a mechanism for suppressing the leakage of an iodine molecule according to aspects of the present invention.
Figure 5B:
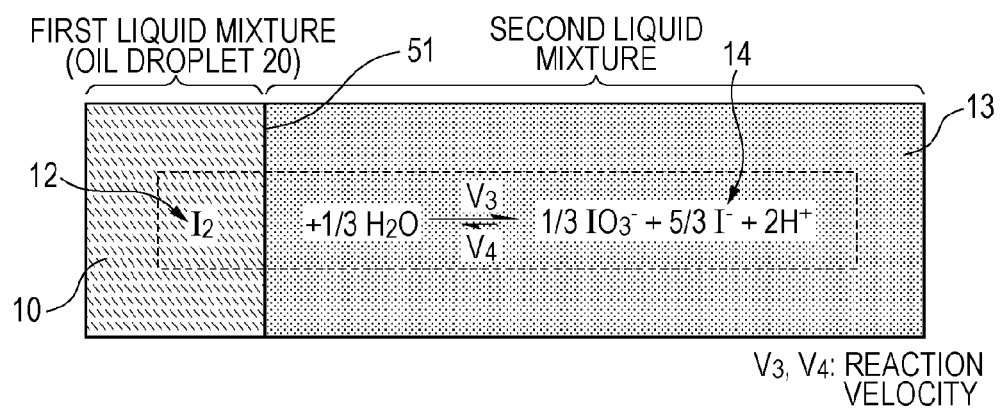
FIG. 5B is a drawing illustrating a mechanism of the leakage of an iodine molecule in the related art.

This effect will be described with reference to FIGS. 5A and 5B. FIGS. 5A and 5B are drawings for explaining a mechanism for suppressing the leakage of an iodine molecule. FIG. 5A illustrates a mechanism for suppressing the leakage of an iodine molecule according to aspects of the present invention. FIG. 5B illustrates a mechanism of the leakage of an iodine molecule in the related art.

In the related art illustrated in FIG. 5B, as described above, an iodine molecule 12 dissolved in water 13 through an interface 51 between an oil droplet 20 and the water 13 is hydrolyzed by a large amount of water 13 present around the iodine molecule 12 to generate an iodide ion 14. The amount of iodide ion 14 generated in this case is extremely smaller than the amount of water 13. Therefore, a velocity $v_3$ of the hydrolysis reaction of the iodine molecule 12 is higher than a velocity $v_4$ of the reverse reaction thereof ($v_3 > v_4$). Consequently, under the condition that the amount of hydrolysis product of the iodine molecule 12, such as the iodide ion 14, is extremely smaller than the amount of water 13, iodine molecules 12 continue to leak into the water 13 in the form of iodide ions 14. Accordingly, as represented by formula (1), the molecular weight in reverse iodine transfer polymerization depends on the amount of iodine molecules charged, and thus the above-described leakage of iodine molecules 12 causes a significant problem in achieving satisfactory molecular-weight controllability. Furthermore, it is also concerned that dispersion stability of the suspension may be impaired by a hydrogen ion ($H^+$) generated together with the iodide ion 14 in the hydrolysis reaction of the iodine molecule 12.

In contrast, in aspects of the present invention, as illustrated in FIG. 5A, the hydrolysis reaction of an iodine molecule 12 hardly occurs because iodide ions 14 are incorporated in the second liquid mixture in advance. Consequently, the reaction reaches an equilibrium state at an initial stage of the suspension step, and a velocity $v_1$ of the hydrolysis reaction of the iodine molecule 12 becomes equal to a velocity $v_2$ of the reverse reaction thereof ($v_1 = v_2$). Thus, it is possible to suppress the leakage of the iodine molecule 12 into water 13 through an interface 50 in the form of an iodide ion 14, and thus satisfactory molecular-weight controllability can be achieved. Accordingly, the method for producing polymer particles according to this embodiment can realize satisfactory molecular-weight controllability.

[First Liquid Mixture]

The first liquid mixture according to aspects of the present invention is a liquid containing at least an oily olefin monomer, a radical polymerization initiator, and iodine molecules. The first liquid mixture may further contain oily organic solvents as an auxiliary agent that promotes compatibilization. In particular, in the case where the oily olefin monomer is solid at room temperature, oily organic solvents may be used in combination. Examples of the oily organic solvents used include, but are not limited to, common oily organic solvents such as toluene, benzene, chloroform, and ethyl acetate. Two or more oily organic solvents may be used in combination.

The first liquid mixture may contain functional substances in addition to an oily olefin monomer, a radical polymerization initiator, and an iodine molecule.

Examples of the functional substance include imide compounds such as N-iodosuccinimide, succinimide, maleimide, and phthalic imide; aromatic amine compounds such as diphenylamine; and phosphorous acid compounds such as diethyl phosphite. The group of these compounds functions as a polymerization catalyst in reverse iodine transfer polymerization and thus contributes to an improvement in the rate of polymerization.

The first liquid mixture may contain, as a functional substance, a hydrophobe (co-surfactant) soluble with the first liquid mixture and having solubility in water of 0.01 g/L or less. The use of the hydrophobe stabilizes a suspension. This is advantageous in that very small oil droplets can be formed in a suspension step described below.

Specific examples of the hydrophobe include a group of compounds such as (a) C8 to C30 linear chain, branched chain, or cyclic alkanes, e.g., hexadecane, squalane, and cyclooctane; (b) C8 to C30 alkyl (meth)acrylates, e.g., stearyl methacrylate and dodecyl methacrylate; (c) C8 to C30 alkyl alcohols, e.g., cetyl alcohol; (d) C8 to C30 alkylthiols, e.g., dodecyl mercaptan; (e) polymers, e.g., polyurethane, polyester, and polystyrene; and (f) long-chain aliphatic or aromatic carboxylic acids, long-chain aliphatic or aromatic carboxylic acid esters, long-chain aliphatic or aromatic amines, ketones, halogenated alkanes, silanes, siloxanes, and isocyanates.

The functional substance is not limited to the above substances, and two or more functional substances may be used in combination.

[Oily Olefin Monomer]

The oily olefin monomer used in aspects of the present invention is a monomer that is substantially immiscible with water and that forms an interface when mixed with water. The solubility of the oily olefin monomer in water may be 3% (3 g of the oily olefin monomer relative to 100 g of water) or less at room temperature (20° C.). When this condition is satisfied, a suspension can be satisfactorily formed in the suspension step. In addition, the oily olefin monomer used in aspects of the present invention is a radical polymerizable olefin monomer that can be polymerized by cleavage of a radical polymerization initiator.

Polymerizable unsaturated aromatic monomers and polymerizable carboxylic acid esters may be used as the oily olefin monomer in aspects of the present invention from the standpoint of compatibility with organic solvents, stability of a suspension, controllability of a polymerization reaction, etc. Specific examples of the oily olefin monomer include, but are not limited to, styrene, chlorostyrene, α-methylstyrene, divinylbenzene, vinyltoluene, methyl (meth)acrylate, ethyl (meth)acrylate, and butyl (meth)acrylate. These oily olefin monomers may be used alone. Alternatively, a plurality of oily olefin monomers may be mixed to form a copolymer, as required. Alternatively, a plurality of oily olefin monomers may be sequentially added to form a gradient copolymer or a block copolymer. In particular, in order to obtain polymer particles containing a block copolymer, the polymerization step may be conducted in multiple stages. For example, polymer particles containing a block copolymer are obtained by conducting a polymerization step in a first stage using a single type of oily olefin monomer, and then charging another type of oily olefin monomer in the resulting suspension to conduct a polymerization step in a second stage.

[Radical Polymerization Initiator]

Known radical polymerization initiators can be used in aspects of the present invention. Among known radical polymerization initiators, it may be the case that oil-soluble radical polymerization initiators that have solubility in water at 20° C. of 10% by weight or less and that are soluble in the oily olefin monomer at reaction temperatures are used in the synthesis step and the polymerization step. In order to achieve a satisfactory polymerization conversion rate, the redox potential of the radical polymerization initiator according to aspects of the present invention may be lower (less noble) than the redox potential (0.54 V vs. SHE) of $I_2/I^-$ (iodine molecule/iodide ion). This is because, in the case where the redox potential of the radical polymerization initiator is lower than the redox potential of $I_2/I^-$ (iodine molecule/iodide ion), it is possible to suppress an unintended decomposition reaction of the radical polymerization initiator, the decomposition reaction being caused by the reduction of the radical polymerization initiator by iodide ions. Whether the redox potential of the radical polymerization initiator is lower than the redox potential of $I_2/I^-$ (iodine molecule/iodide ion) can be verified by the following method. Specifically, a saturated aqueous solution of potassium iodide is added dropwise to a solution containing a radical polymerization initiator, e.g., an N,N-dimethylformamide solution containing a radical polymerization initiator, and the change in the color of the solution is observed. When the color of the solution changes to yellow or brown and thus the generation of iodine molecules is confirmed, the redox potential of the radical polymerization initiator is higher than the redox potential of $I_2/I^-$ (iodine molecule/iodide ion).

Specific examples of the radical polymerization initiator mainly include azo polymerization initiators such as 2,2'-azobisisobutyronitrile (AIBN), 2,2'-azobis-(2-methylpropanenitrile), 2,2'-azobis-(2,4-dimethylpentanenitrile), 2,2'-azobis-(2-methylbutanenitrile), 1,1'-azobis-(cyclohexanecarbonitrile), 2,2'-azobis-(2,4-dimethyl-4-methoxyvaleronitrile), and 2,2'-azobis-(2,4-dimethylvaleronitrile). Organic peroxide polymerization initiators having a redox potential lower than the redox potential of $I_2/I^-$ (iodine molecule/iodide ion) may also be used in aspects of the present invention. Specific examples thereof include alkyl peroxy esters such as t-butyl peroxy pivalate and t-butyl-peroxy-2-ethyl hexanoate. Photoradical polymerization initiators such as acetophenones and ketals may also be used. However, the radical polymerization initiator is not limited to the above polymerization initiators. These radical polymerization initiators may be used alone or as a mixture of two or more initiators, as required.

The radical polymerization initiator may be additionally added at a timing of the suspension step 1 in FIG. 1 and subsequent steps.

[Second Liquid Mixture]

The second liquid mixture according to aspects of the present invention is a liquid containing at least water and an iodide ion ($I^-$). The content of iodide ion in the second liquid mixture in aspects of the present invention may be $5 \times 10^{-2}$ mol/L or more and 5 mol/L or less, and even $1 \times 10^{-1}$ mol/L or more and 1 mol/l or less. If the content of iodide ion in the second liquid mixture is less than $5 \times 10^{-2}$ mol/L, the hydrolysis reaction of an iodine molecule cannot be sufficiently suppressed. If the content of iodide ion in the second liquid mixture exceeds 5 mol/L, dispersibility of a suspension may be degraded, which is not preferable.

Common water-soluble iodide salts can be used as the material of the iodide ion. Examples of the iodide salt include, but are not limited to, alkali (alkaline earth) metal iodide salts such as potassium iodide, sodium iodide, magnesium iodide, calcium iodide, cesium iodide, and barium iodide; and ammonium iodide salts such as ammonium iodide, tetramethyl ammonium iodide, and acetylcholine iodide. These iodide salts may be used alone or as a mixture of two or more iodide salts, as required.

[Iodine Compound]

The iodine compound in aspects of the present invention is produced by a reaction between a radical generated by cleavage of the radical polymerization initiator of aspects of the present invention and an iodine molecule. The iodine compound according to aspects of the present invention will now be described with reference to FIGS. 3A and 3B.

FIGS. 3A and 3B are drawings each illustrating a production mechanism of an iodine compound in reverse iodine transfer polymerization. As illustrated in FIGS. 3A and 3B, an iodine compound 31 is produced by a reaction between a radical having a chemical structure of a residue 30 generated by cleavage of a radical polymerization initiator 11 and an iodine molecule. That is, the iodine compound 31 has a chemical structure in which an iodine atom is directly bonded to the residue 30. Alternatively, the iodine compound may have a chemical structure in which an iodine atom is directly bonded to a derivative of the residue 30, the derivative being generated by further cleavage of a radical having the chemical structure of the residue 30. Furthermore, an oligomer 32 in which an oily olefin monomer 10 is interposed between the residue 30 and an iodine atom may be mixed as an iodine compound 16. In general, since such the iodine compound has lipophilicity significantly higher than that of iodine molecules, the iodine compound remains in the oil droplets in the suspension without leaking into the aqueous phase. FIG. 3A illustrates a case where azo polymerization initiators are used as the radical polymerization initiator 11, and FIG. 3B illustrates a case where organic peroxide polymerization initiators are used as the radical polymerization initiator 11.

Suspension Step

The suspension step in aspects of the present invention is a step of suspending a first liquid mixture containing an oily olefin monomer, a radical polymerization initiator, and an iodine molecule in a second liquid mixture containing water and an iodide ion to prepare a suspension in which oil droplets composed of the first liquid mixture are dispersed in the second liquid mixture.

The suspension is obtained by mixing and dispersing the first liquid mixture and the second liquid mixture. Regarding the mixing ratio of the second liquid mixture to the first liquid mixture, the molar ratio of an iodide ion contained in the second liquid mixture to an iodine molecule contained in the first liquid mixture [iodide ion (mol)/iodine molecule (mol)] may be 0.1 or more and 1,000 or less, and even 0.5 or more and 500 or less.

A known stirring and shearing device can be used for the suspension according to aspects of the present invention. The suspension can be prepared by providing mechanical energy using, for example, a high-shear homomixer, an ultrasonic homogenizer, a high-pressure homogenizer, or a thin-film rotating high-speed mixer. For the suspension in aspects of the present invention, it is also possible to use a known suspension method for obtaining a suspension on the basis of a surface-chemical mechanism, such as a membrane emulsification method using a shirasu porous glass (SPG) membrane, or a microreactor in a microchannel emulsification method, a branched microchannel emulsification method, or the like. These methods may be used alone or in combination of two or more methods.

In the suspension step according to aspects of the present invention, a dispersant may be incorporated in water in order to improve dispersion stability of the suspension. The dispersant may be incorporated at any timing of before the suspension step, during the suspension step, and after the suspension step. However, the dispersant may in one case be incorporated before or during the suspension step. In aspects of the present invention, known dispersants can be used. Examples of the dispersant include anionic low-molecular-weight surfactants, cationic low-molecular-weight surfactants, nonionic low-molecular weight surfactants, anionic polymer dispersants, cationic polymer dispersants, nonionic polymer dispersants, and inorganic dispersants. Among these dispersants, inorganic dispersants may be provided because they have a high effect of improving dispersion stability based on a blocking action and exhibit good stability against a temperature change.

Furthermore, the use of inorganic dispersants may be provided from the standpoint that polymer particles, which are target substances, can be easily isolated and purified. Examples of the inorganic dispersant include, but are not limited to, polyvalent metal salts of phosphoric acid such as calcium phosphate, tricalcium phosphate, magnesium phosphate, aluminum phosphate, and zinc phosphate; carbonates such as calcium carbonate and magnesium carbonate; inorganic salts such as calcium metasilicate, calcium sulfate, and barium sulfate; calcium hydroxide; magnesium hydroxide; aluminum hydroxide; silica; bentonite; and alumina.

These dispersants may be used alone or in combination of two or more dispersants. In addition, a chemical substance other than the dispersant may be added to water before the suspension step, during the suspension step, or after the suspension step.

In the method disclosed in Non-Patent Literature 4, since an excessive amount of hydrochloric acid is added to water, in particular, the dispersion-stabilizing performances of anionic low-molecular-weight surfactants, anionic polymer dispersants, and inorganic dispersants are degraded. Accordingly, this method may be disadvantageous as a method for producing polymer particles. In contrast, in aspects of the present invention, any dispersant can be satisfactorily used, and thus the method according to aspects of the present invention is advantageous as a method for producing polymer particles.

Synthesis Step

The synthesis step in aspects of the present invention is a step of synthesizing an iodine compound by allowing a radical generated from a radical polymerization initiator to react with an iodine molecule in an oil droplet having the first liquid mixture and dispersed in the second liquid mixture, and corresponds to the inhibition period of reverse iodine transfer polymerization. As a method for inducing the inhibition period, a known method such as heating, light irradiation, or addition of a reducing agent may be used. Among these methods, heating may be performed from the standpoint of good workability and controllability of the reaction. In the case where the reaction is induced by heating, the heating may be performed in the range of a 10-hour half-life temperature of the radical polymerization initiator or higher and 40° C. higher than the 10-hour half-life temperature or lower. According to one aspect, the heating is performed in the range of the 10-hour half-life temperature of the radical polymerization initiator or higher and 30° C. higher than the 10-hour half-life temperature or lower. When the heating is performed at a temperature higher than a temperature that is 40° C. higher than the 10-hour half-life temperature, controllability of the reaction may become significantly degraded. When the heating is performed at a temperature lower than the 10-hour half-life temperature, the operation time for the synthesis step can become very long. Thus, heating at a temperature lower than the 10-hour half-life temperature may not be performed from the standpoint of controllability of the reaction and the operating efficiency. A plurality of methods may be used in combination as a method for inducing the inhibition period. The method for inducing the inhibition period of reverse iodine transfer polymerization according to aspects of the present invention may be performed in an atmosphere of an inert gas such as argon gas or nitrogen gas.

Polymerization Step

The polymerization step in aspects of the present invention is a step of inducing the polymerization period of reverse iodine transfer polymerization in an oil droplet having the first liquid mixture and dispersed in water to obtain polymer particles.

A method for inducing the polymerization period of reverse iodine transfer polymerization is the same as a common method for inducing radical polymerization. Specifically, a known method such as heating, light irradiation, or addition of a reducing agent can be used. Among these methods, heating is preferable from the standpoint of good workability and controllability of a reaction. In the case where the polymerization period is induced by heating, the heating may be performed in the range of a 10-hour half-life temperature of the radical polymerization initiator or higher and 40° C. higher than the 10-hour half-life temperature or lower. According to one aspect, the heating is performed in the range of the 10-hour half-life temperature of the radical polymerization initiator or higher and 30° C. higher than the 10-hour half-life temperature or lower. When the heating is performed at a temperature higher than a temperature that is 40° C. higher than the 10-hour half-life temperature, controllability of the polymerization reaction may become significantly degraded. Heating at a temperature of higher than 100° C. may not be provided because the water of the suspension may boil. When the heating is performed at a temperature lower than the 10-hour half-life temperature, the operation time for the polymerization step can become very long. Thus, heating at a temperature lower than the 10-hour half-life temperature may not be performed from the standpoint of controllability of the polymerization reaction and the operating efficiency. In the polymerization step according to aspects of the present invention, the heating temperature may be increased or decreased. A plurality of methods may be used in combination as a method for inducing the polymerization period of reverse iodine transfer polymerization. The method for inducing the polymerization period of reverse iodine transfer polymerization according to aspects of the present invention may be performed in an atmosphere of an inert gas such as argon gas or nitrogen gas.

In aspects of the present invention, a molar ratio of the radical polymerization initiator to iodine molecules, i.e., [radical polymerization initiator (mol/L)]/[iodine molecule (mol/L)] may be more than 1 and 20 or less. In the case where the molar ratio is 1 or less, the polymerization reaction terminates, and thus it is difficult to achieve a satisfactory polymerization conversion rate. On the other hand, in the case where the molar ratio exceeds 20, a chain reaction of the monomer without intervention of an iodine compound occurs as a side reaction, and thus it is difficult to achieve satisfactory molecular-weight controllability. A molar ratio of the oily olefin monomer to iodine molecules, i.e., [oily olefin monomer]/[iodine molecule] can be appropriately changed.

[Method for Recovering Polymer Particles]

Polymer particles obtained by the method according to aspects of the present invention can be recovered from the aqueous dispersion of polymer particles obtained in the polymerization step by solid-liquid separation using a method such as decantation, filtration, or centrifugal separation. The method for recovering the polymer particles is not limited thereto, and other known methods may also be used. These methods may be used alone or in combination of two or more methods.

[Polymer Particles]

The particle diameter of polymer particles according to aspects of the present invention can be appropriately adjusted by changing, for example, the suspension method in the suspension step or the type or the amount of dispersant used. The particle diameter of the polymer particles is not particularly limited. However, the number-average particle diameter of the polymer particles may be 300 µm or less, such as 20 nm or more and 100 µm or less, and even 50 nm or more and 50 µm or less.

The polymer particles according to aspects of the present invention contain a polymer compound having an iodine atom at an end of a polymer chain. Such an iodine atom at an end can be identified by nuclear magnetic resonance (NMR) spectroscopy or the like. For example, an iodine atom bonded to an end of a polystyrene chain prepared on the basis of aspects of the present invention can be identified by detecting a signal (at 4 to 5 ppm in deuterochloroform) of a proton adjacent to the iodine atom by $^1$H NMR spectroscopy.

EXAMPLES

Examples of a method for producing polymer particles according to aspects of the present invention will now be described. However, the present invention is not limited to these Examples.

Method for Measuring Particle Diameter

Regarding the particle diameter of polymer particles, the number-average particle diameter was measured with a precise particle size distribution analyzer using a pore electrical resistance method "Coulter Counter Multisizer 3" (registered trademark, manufactured by Beckman Coulter, Inc.). In the measurement, "ISOTON II" (manufactured by Beckman Coulter, Inc.) was used as an electrolyte aqueous solution. On the other hand, regarding polymer particles having a particle diameter of less than 1 µm, the number-average particle diameter was measured with a precise particle size distribution analyzer using a dynamic light scattering method "DLS8000" (manufactured by Otsuka Electronics Co., Ltd.).

Method for Measuring Polymerization Conversion Rate

A polymerization conversion rate was determined on the basis of a calibration curve method from the amount of oily olefin monomer consumed in the polymerization step, the amount being measured by gas chromatography (apparatus: manufactured by Agilent Technologies, column: HP-5 manufactured by Agilent Technologies).

Measurement of Molecular Weight

Regarding molecular weights, the number-average molecular weight ($M_n$), the weight-average molecular weight ($M_w$), and the peak molecular weight ($M_p$) were measured by gel permeation chromatography (apparatus: HLC-8121GPC/HT, manufactured by Tosoh Corporation, column: TSKgel G2000H$_{XL}$/G3000H$_{XL}$/G4000H$_{XL}$, manufactured by Tosoh Corporation).

Evaluation of Molecular-weight Controllability

Molecular-weight controllability was evaluated by comparing a peak molecular weight ($M_{p, suspension}$) in the case where suspension polymerization and reverse iodine transfer polymerization were combined with a peak molecular weight ($M_{p, bulk}$) in the case where reverse iodine transfer polymerization was conducted by bulk polymerization with reference to Non-Patent Literature 3 at a polymerization conversion rate of 90% or more. Specifically, when a ratio $M_{p, suspension}/M_{p, bulk}$ was in the range of 0.9 to 1.1, the molecular-weight controllability was evaluated as "good" and denoted by "A". When the ratio was out of the above range, the molecular-weight controllability was evaluated as "poor" and denoted by "B". When the evaluation could not be conducted, the evaluation result of the molecular-weight controllability was denoted by "–".

Example 1

[Suspension Step]

In a 100-mL glass container, 8.4 mmol of 2,2'-azobis-(2,4-dimethylvaleronitrile) (V-65; manufactured by Wako Pure Chemical Industries, Ltd., azo radical polymerization initiator, 10-hour half-life temperature: 51° C.), 2.8 mmol of iodine molecules, and 0.54 mol of styrene were uniformly mixed. A dark red first liquid mixture was then obtained. Meanwhile, 2.2 g of tricalcium phosphate (inorganic dispersant) was added to 200 g of ion-exchange water, and the mixture was stirred at 15,000 rpm for 30 minutes to prepare a dispersion at 30° C. Subsequently, 0.02 mol of potassium iodide was dissolved in the dispersion to prepare a second liquid mixture (pH 8 to 9). The content of iodide ion in the second liquid mixture was $1\times10^{-1}$ mol/L in terms of the amount of potassium iodide.

Next, the first liquid mixture was poured into the second liquid mixture in a nitrogen atmosphere at one time. The mixture was stirred at 15,000 rpm for 10 minutes in a nitrogen atmosphere, and the stirring was then stopped. Thus, an orange suspension was obtained.

[Synthesis Step and Polymerization Step]

The suspension was heated to 70° C. with a water bath while stirring at 200 rpm in a nitrogen atmosphere using a mechanical stirrer. After the start of the heating, the orange color of the suspension gradually became light, and changed to white after about 30 minutes. This change in the color from orange to white shows that, in the inhibition period, iodine molecules in the suspension reacted with radicals generated by cleavage of V-65 to form an iodine compound. During this period, a polymerization reaction of the monomer hardly occurred, and the conversion rate was 0%.

A polymerization step was subsequently conducted. The white suspension was heated to 70° C. with a water bath in a nitrogen atmosphere. The suspension after six hours from the start of the heating was sampled, and the particle diameter (number-average particle diameter), the polymerization conversion rate, the peak molecular weight ($M_{p, suspension}$) and the molecular-weight distribution ($M_w/M_n$) of the resulting polymer particles were measured. The molecular-weight controllability was evaluated by a comparison with the peak molecular weight ($M_{p, bulk}$) in Reference Example 1. The results are summarized in Table 1.

Example 2

Polymer particles were obtained as in Example 1 except that 0.54 mol of styrene in Example 1 was changed to 0.56 mol of methyl methacrylate. A suspension after six hours from the start of heating in the polymerization step was sampled, and the particle diameter, the polymerization conversion rate, the peak molecular weight ($M_{p, suspension}$) and the molecular-weight distribution ($M_w/M_n$) of the resulting polymer particles were measured. The molecular-weight controllability was evaluated by a comparison with the peak molecular weight ($M_{p, bulk}$) in Reference Example 2. The results are summarized in Table 1.

Example 3

Polymer particles were obtained as in Example 1 except that 0.54 mol of styrene in Example 1 was changed to 0.43 mol of styrene and 0.11 mol of methyl methacrylate. A suspension after seven hours from the start of heating in the polymerization step was sampled, and the particle diameter, the polymerization conversion rate, the peak molecular weight ($M_{p,\ suspension}$), and the molecular-weight distribution ($M_w/M_n$) of the resulting polymer particles were measured. The molecular-weight controllability was evaluated by a comparison with the peak molecular weight ($M_{p,\ bulk}$) in Reference Example 3. The results are summarized in Table 1.

Example 4

Polymer particles were obtained as in Example 1 except that, in Example 1, 8.4 mmol of V-65 was changed to 8.4 mmol of 2,2'-azobisisobutyronitrile (AIBN) (azo polymerization initiator, 10-hour half-life temperature: 65° C.), and the heating temperature in the synthesis step and the polymerization step was changed from 70° C. to 80° C. A suspension after six hours from the start of heating in the polymerization step was sampled, and the particle diameter, the polymerization conversion rate, the peak molecular weight ($M_{p,\ suspension}$) and the molecular-weight distribution ($M_w/M_n$) of the resulting polymer particles were measured. The molecular-weight controllability was evaluated by a comparison with the peak molecular weight ($M_{p,\ bulk}$) in Reference Example 4. The results are summarized in Table 1.

Example 5

Polymer particles were obtained as in Example 2 except that, in Example 2, 8.4 mmol of V-65 was changed to 8.4 mmol of AIBN, and the heating temperature in the synthesis step and the polymerization step was changed from 70° C. to 80° C. A suspension after seven hours from the start of heating in the polymerization step was sampled, and the particle diameter, the polymerization conversion rate, the peak molecular weight ($M_{p,\ suspension}$), and the molecular-weight distribution ($M_w/M_n$) of the resulting polymer particles were measured. The molecular-weight controllability was evaluated by a comparison with the peak molecular weight ($M_{p,\ bulk}$) in Reference Example 5. The results are summarized in Table 1.

Example 6

Polymer particles were obtained as in Example 3 except that, in Example 3, 8.4 mmol of V-65 was changed to 8.4 mmol of AIBN, and the heating temperature in the synthesis step and the polymerization step was changed from 70° C. to 80° C. A suspension after seven hours from the start of heating in the polymerization step was sampled, and the particle diameter, the polymerization conversion rate, the peak molecular weight ($M_{p,\ suspension}$) and the molecular-weight distribution ($M_w/M_n$) of the resulting polymer particles were measured. The molecular-weight controllability was evaluated by a comparison with the peak molecular weight ($M_{p,\ bulk}$) in Reference Example 6. The results are summarized in Table 1.

Example 7

Polymer particles were obtained as in Example 1 except that the amount of potassium iodide in the second liquid mixture in Example 1 was changed from 0.02 mol to 0.01 mol (the content of iodide ion in the second liquid mixture was changed to $5 \times 10^{-2}$ mol/L in terms of the amount of potassium iodide). A suspension after seven hours from the start of heating in the polymerization step was sampled, and the particle diameter, the polymerization conversion rate, the peak molecular weight ($M_{p,\ suspension}$), and the molecular-weight distribution ($M_w/M_n$) of the resulting polymer particles were measured. The molecular-weight controllability was evaluated by a comparison with the peak molecular weight ($M_{p,\ bulk}$) in Reference Example 1. The results are summarized in Table 1.

Example 8

Polymer particles were obtained as in Example 1 except that the amount of potassium iodide in the second liquid mixture in Example 1 was changed from 0.02 mol to 0.2 mol (the content of iodide ion in the second liquid mixture was changed to 1 mol/L in terms of the amount of potassium iodide). A suspension after seven hours from the start of heating in the polymerization step was sampled, and the particle diameter, the polymerization conversion rate, the peak molecular weight ($M_{p,\ suspension}$), and the molecular-weight distribution ($M_w/M_n$) of the resulting polymer particles were measured. The molecular-weight controllability was evaluated by a comparison with the peak molecular weight ($M_{p,\ bulk}$) in Reference Example 1. The results are summarized in Table 1.

Example 9

Polymer particles were obtained as in Example 1 except that 0.07 mmol of N-iodosuccinimide was added as a functional substance to the first liquid mixture in Example 1. A suspension after seven hours from the start of heating in the polymerization step was sampled, and the particle diameter, the polymerization conversion rate, the peak molecular weight ($M_{p,\ suspension}$) and the molecular-weight distribution ($M_w/M_n$) of the resulting polymer particles were measured. The results obtained from this sample were substantially the same as those of Example 1. On the other hand, a suspension after two hours from the start of heating in the polymerization step was sampled, and the polymerization conversion rate was measured. The polymerization conversion rate was 68%. This value was higher than 61%, which was a polymerization conversion rate at the same heating time in Example 1. Thus, it was confirmed that the rate of polymerization was improved by adding N-iodosuccinimide.

Example 10

[Suspension Step]

In a 100-mL glass container, 8.4 mmol of 2,2'-azobis-(2,4-dimethylvaleronitrile) (V-65; manufactured by Wako Pure Chemical Industries, Ltd., azo radical polymerization initiator, 10-hour half-life temperature: 51° C.), 2.8 mmol of iodine molecules, 0.20 mol of butyl acrylate, and 20 g of toluene were uniformly mixed. A dark red first liquid mixture was then obtained. Meanwhile, 2.2 g of tricalcium phosphate (inorganic dispersant) was added to 200 g of ion-exchange water, and the mixture was stirred at 15,000 rpm for 30 minutes to prepare a dispersion at 30° C. Subsequently, 0.02 mol of potassium iodide was dissolved in the dispersion to prepare a second liquid mixture (pH 8 to 9). The content of iodide ion in the second liquid mixture was $1 \times 10^{-1}$ mol/L in terms of the amount of potassium iodide.

Next, the first liquid mixture was poured into the second liquid mixture in a nitrogen atmosphere at one time. The mixture was stirred at 15,000 rpm for 10 minutes in a nitrogen atmosphere, and the stirring was then stopped. Thus, an orange suspension was obtained.

[Synthesis Step and Polymerization Step]

The suspension was heated to 70° C. with a water bath while stirring at 200 rpm in a nitrogen atmosphere using a mechanical stirrer. After the start of the heating, the orange color of the suspension gradually became light, and changed to white after about 30 minutes. This change in the color from orange to white shows that, in the inhibition period, iodine molecules in the suspension reacted with radicals generated by cleavage of V-65 to form an iodine compound. During this period, a polymerization reaction of the monomer hardly occurred, and the conversion rate was 0%.

Subsequently, a polymerization step in a first stage was conducted. The white suspension was heated to 70° C. with a water bath in a nitrogen atmosphere. A suspension 1 after four hours from the start of the heating was sampled.

Subsequently, a polymerization step in a second stage was conducted. A solution prepared by dissolving 2.0 mmol of V-65 in 0.34 mol of styrene was finely dispersed in 100 g of water using an ultrasonic homogenizer to prepare a dispersion. This dispersion was charged in the suspension 1, and the resulting mixture was further heated at 70° C. for 12 hours and then sampled as a suspension 2.

The polymerization conversion rate, the peak molecular weight ($M_{p,\ suspension}$), and the molecular-weight distribution ($M_w/M_n$) of the polymer particles in the suspension 1 were measured. It was confirmed that the polymerization conversion rate was 100%, the peak molecular weight ($M_{p,\ suspension}$) was 4,500, and the molecular-weight distribution ($M_w/M_n$) was 1.8. The polymerization conversion rate, the peak molecular weight ($M_{p,\ suspension}$), and the molecular-weight distribution ($M_w/M_n$) of the polymer particles in the suspension 2 were measured. It was confirmed that the polymerization conversion rate was 93%, the peak molecular weight ($M_{p,\ suspension}$) was 10,200, and the molecular-weight distribution ($M_w/M_n$) was 1.6.

From the above results, it was considered that polymer particles containing a block copolymer composed of butyl acrylate and styrene could be prepared.

Example 11

[Suspension Step]

In a 100-mL glass container, 8.4 mmol of 2,2'-azobis-(2,4-dimethylvaleronitrile) (V-65; manufactured by Wako Pure Chemical Industries, Ltd., azo radical polymerization initiator, 10-hour half-life temperature: 51° C.), 2.8 mmol of iodine molecules, 0.54 mol of styrene, and 0.034 mol of hexadecane were uniformly mixed. A dark red first liquid mixture was then obtained. Meanwhile, 4.7 mmol of sodium dodecyl sulfate was added to 90 g of ion-exchange water to prepare a dispersion at 30° C. Subsequently, 9.0 mmol of potassium iodide was dissolved in the dispersion to prepare a second liquid mixture (pH 8 to 9). The content of iodide ion in the second liquid mixture was $1 \times 10^{-1}$ mol/L in terms of the amount of potassium iodide.

Next, the second liquid mixture and the first liquid mixture were mixed in a nitrogen atmosphere, and the resulting mixture was treated with an ultrasonic homogenizer of 300 W at 4° C. for ten minutes in a nitrogen atmosphere. Thus, an orange suspension was obtained.

[Synthesis Step and Polymerization Step]

The suspension was heated to 70° C. with a water bath while stirring at 200 rpm in a nitrogen atmosphere using a mechanical stirrer. After the start of the heating, the orange color of the suspension gradually became light, and changed to white after about 30 minutes. This change in the color from orange to white shows that, in the inhibition period, iodine molecules in the suspension reacted with radicals generated by cleavage of V-65 to form an iodine compound. During this period, a polymerization reaction of the monomer hardly occurred, and the conversion rate was 0%.

A polymerization step was subsequently conducted. The white suspension was heated to 70° C. with a water bath in a nitrogen atmosphere. The suspension after six hours from the start of the heating was sampled, and the particle diameter (number-average particle diameter), the polymerization conversion rate, the peak molecular weight ($M_{p,\ suspension}$) and the molecular-weight distribution ($M_w/M_n$) of the resulting polymer particles were measured. The particle diameter was 185 nm, the polymerization conversion rate was 93%, the peak molecular weight ($M_{p,\ suspension}$) was 10,400, and the molecular-weight distribution ($M_w/M_n$) was 1.5. The peak molecular weight ($M_{p,\ suspension}$) of this Example was compared with the peak molecular weight ($M_{p,\ bulk}$) in Reference Example 1. The ratio $M_{p,\ suspension}/M_{p,\ bulk}$ was in the range of 0.9 to 1.1. Thus, it was considered that the molecular-weight controllability of this Example was good.

Reference Example 1

Reference Examples described below are examples in which bulk polymerization was used in a polymerization reaction. Bulk polymerization is a polymerization reaction that occurs in a single oil droplet. In other words, bulk polymerization can be considered to be a reaction in only a single oil droplet of suspension polymerization. Therefore, a suspension polymerization in which bulk polymerization is collected is considered to be an ideal suspension polymerization.

Accordingly, in Reference Examples described below, whether data of Examples described above is ideal data or not is determined by comparing data of bulk polymerization with data of corresponding Example.

In a 100-mL glass container, 8.4 mmol of V-65, 2.8 mmol of iodine molecules, and 0.54 mol of styrene were charged and uniformly mixed. A dark purple-red liquid mixture was then obtained. Subsequently, nitrogen gas was bubbled through the liquid mixture in an ice bath at a flow rate of 200 mL/min for 30 minutes to remove oxygen dissolved in the liquid mixture, and the liquid mixture was then heated to 70° C. in a water bath in a nitrogen atmosphere. A polymer compound was obtained after six hours from the start of the heating. The polymerization conversion rate, the peak molecular weight ($M_{p,\ bulk}$), and the molecular-weight distribution ($M_w/M_n$) of the polymer compound were measured. The results are summarized in Table 1.

Reference Example 2

A polymer compound was obtained as in Reference Example 1 except that 0.54 mol of styrene in Reference Example 1 was changed to 0.56 mol of methyl methacrylate. The polymerization conversion rate, the peak molecular weight ($M_{p,\ bulk}$), and the molecular-weight distribution ($M_w/M_n$) of the polymer compound obtained after six hours from the start of heating were measured. The results are summarized in Table 1.

Reference Example 3

A polymer compound was obtained as in Reference Example 1 except that 0.54 mol of styrene in Reference Example 1 was changed to 0.43 mol of styrene and 0.11 mol of methyl methacrylate. The polymerization conversion rate, the peak molecular weight ($M_{p,\ bulk}$), and the molecular-weight distribution ($M_w/M_n$) of the polymer compound obtained after six hours from the start of heating were measured. The results are summarized in Table 1.

Reference Example 4

A polymer compound was obtained as in Reference Example 1 except that, in Reference Example 1, 8.4 mmol of V-65 was changed to 8.4 mmol of AIBN, and the heating temperature during polymerization was changed from 70° C. to 80° C. The polymerization conversion rate, the peak molecular weight ($M_{p, bulk}$), and the molecular-weight distribution ($M_w/M_n$) of the polymer compound obtained after six hours from the start of heating were measured. The results are summarized in Table 1.

Reference Example 5

A polymer compound was obtained as in Reference Example 2 except that, in Reference Example 2, 8.4 mmol of V-65 was changed to 8.4 mmol of AIBN, and the heating temperature during polymerization was changed from 70° C. to 80° C. The polymerization conversion rate, the peak molecular weight ($M_{p, bulk}$), and the molecular-weight distribution ($M_w/M_n$) of the polymer compound obtained after six hours from the start of heating were measured. The results are summarized in Table 1.

Reference Example 6

A polymer compound was obtained as in Reference Example 3 except that, in Reference Example 3, 8.4 mmol of V-65 was changed to 8.4 mmol of AIBN, and the heating temperature during polymerization was changed from 70° C. to 80° C. The polymerization conversion rate, the peak molecular weight ($M_{p, bulk}$), and the molecular-weight distribution ($M_w/M_n$) of the polymer compound obtained after seven hours from the start of heating were measured. The results are summarized in Table 1.

Comparative Example 1

[Suspension Step]
A red suspension was obtained as in Example 1 except that a dispersion (pH 6.5 to 7.0) at 30° C. prepared by dispersing 2.2 g of tricalcium phosphate particles (inorganic dispersant) in 200 g of ion-exchange water was used instead of the second liquid mixture containing potassium iodide in the suspension step of Example 1.
[Synthesis Step and Polymerization Step]
The suspension was heated to 70° C. with a water bath while stirring at 200 rpm in a nitrogen atmosphere using a mechanical stirrer. After the start of the heating, the red color of the suspension gradually became light, and changed to white after about 30 minutes. This change in the color from red to white shows that iodine molecules in the suspension reacted with radicals generated by cleavage of V-65 to form an iodine compound. During this period, a polymerization reaction of the monomer hardly occurred, and the conversion rate was 0%.

A polymerization step was subsequently conducted. The white suspension was heated to 70° C. with a water bath in a nitrogen atmosphere. The suspension after six hours from the start of the heating was sampled, and the particle diameter, the polymerization conversion rate, the peak molecular weight ($M_{p, suspension}$) and the molecular-weight distribution ($M_w/M_n$) of the resulting polymer particles were measured. The molecular-weight controllability was evaluated by a comparison with the peak molecular weight ($M_{p, bulk}$) in Reference Example 1. The results are summarized in Table 1.

Comparative Example 2

Polymer particles were obtained as in Comparative Example 1 except that 0.54 mol of styrene in Comparative Example 1 was changed to 0.56 mol of methyl methacrylate. A suspension after six hours from the start of heating in the polymerization step was sampled, and the particle diameter, the polymerization conversion rate, the peak molecular weight ($M_{p, suspension}$) and the molecular-weight distribution ($M_w/M_n$) of the resulting polymer particles were measured. The molecular-weight controllability was evaluated by a comparison with the peak molecular weight ($M_{p, bulk}$) in Reference Example 2. The results are summarized in Table 1.

Comparative Example 3

Polymer particles were obtained as in Comparative Example 1 except that 0.54 mol of styrene in Comparative Example 1 was changed to 0.43 mol of styrene and 0.11 mol of methyl methacrylate. A suspension after six hours from the start of heating in the polymerization step was sampled, and the particle diameter, the polymerization conversion rate, the peak molecular weight ($M_{p, suspension}$), and the molecular-weight distribution ($M_w/M_n$) of the resulting polymer particles were measured. The molecular-weight controllability was evaluated by a comparison with the peak molecular weight ($M_{p, bulk}$) in Reference Example 3. The results are summarized in Table 1.

Comparative Example 4

Polymer particles were obtained as in Comparative Example 1 except that, in Comparative Example 1, 8.4 mmol of V-65 was changed to 8.4 mmol of AIBN, and the heating temperature in the synthesis step and the polymerization step was changed from 70° C. to 80° C. A suspension after six hours from the start of heating in the polymerization step was sampled, and the particle diameter, the polymerization conversion rate, the peak molecular weight ($M_{p, suspension}$) and the molecular-weight distribution ($M_w/M_n$) of the resulting polymer particles were measured. The molecular-weight controllability was evaluated by a comparison with the peak molecular weight ($M_{p, bulk}$) in Reference Example 4. The results are summarized in Table 1.

Comparative Example 5

Polymer particles were obtained as in Comparative Example 2 except that, in Comparative Example 2, 8.4 mmol of V-65 was changed to 8.4 mmol of AIBN, and the heating temperature in the synthesis step and the polymerization step was changed from 70° C. to 80° C. A suspension after six hours from the start of heating in the polymerization step was sampled, and the particle diameter, the polymerization conversion rate, the peak molecular weight ($M_{p, suspension}$) and the molecular-weight distribution ($M_w/M_n$) of the resulting polymer particles were measured. The molecular-weight controllability was evaluated by a comparison with the peak molecular weight ($M_{p, bulk}$) in Reference Example 5. The results are summarized in Table 1.

Comparative Example 6

Polymer particles were obtained as in Comparative Example 3 except that, in Comparative Example 3, 8.4 mmol of V-65 was changed to 8.4 mmol of AIBN, and the heating temperature in the synthesis step and the polymerization step was changed from 70° C. to 80° C. A suspension after six hours from the start of heating in the polymerization step was sampled, and the particle diameter, the polymerization conversion rate, the peak molecular weight ($M_{p,\ suspension}$) and the molecular-weight distribution ($M_w/M_n$) of the resulting polymer particles were measured. The molecular-weight controllability was evaluated by a comparison with the peak molecular weight ($M_{p,\ bulk}$) in Reference Example 6. The results are summarized in Table 1.

TABLE 1

| | Monomer[Note 1] | Polymerization initiator | Polymerization method | Amount of potassium iodide[Note 2]/ mol/L | Conversion rate/% | Molecular weight: $M_p$ | $M_w/M_n$ | Molecular-weight controllability[Note 3] | Particle diameter/ μm |
|---|---|---|---|---|---|---|---|---|---|
| Example 1 | St | V-65 | Suspension polymerization | $1 \times 10^{-1}$ | 94 | 11,000 | 1.4 | A | 3.5 |
| Example 2 | MMA | | | | 95 | 11,200 | 1.5 | A | 4.4 |
| Example 3 | St/MMA | | | | 97 | 11,500 | 1.4 | A | 3.7 |
| Example 4 | St | AIBN | | | 98 | 10,600 | 1.3 | A | 4.0 |
| Example 5 | MMA | | | | 93 | 10,300 | 1.4 | A | 3.9 |
| Example 6 | St/MMA | | | | 95 | 10,800 | 1.4 | A | 4.2 |
| Example 7 | St | V-65 | | $5 \times 10^{-2}$ | 93 | 11,600 | 1.4 | A | 4.4 |
| Example 8 | | | | 1 | 95 | 10,500 | 1.4 | A | 4.2 |
| Reference Example 1 | St | V-65 | Bulk polymerization | 0 | 92 | 10,200 | 1.4 | — | — |
| Reference Example 2 | MMA | | | | 93 | 10,200 | 1.5 | — | — |
| Reference Example 3 | St/MMA | | | | 96 | 10,600 | 1.4 | — | — |
| Reference Example 4 | St | AIBN | | | 95 | 11,000 | 1.3 | — | — |
| Reference Example 5 | MMA | | | | 94 | 10,800 | 1.4 | — | — |
| Reference Example 6 | St/MMA | | | | 96 | 10,300 | 1.4 | — | — |
| Comparative Example 1 | St | V-65 | Suspension polymerization | 0 | 98 | 16,300 | 1.6 | B | 4.5 |
| Comparative Example 2 | MMA | | | | 96 | 16,900 | 1.5 | B | 3.5 |
| Comparative Example 3 | St/MMA | | | | 98 | 16,600 | 1.5 | B | 4.2 |
| Comparative Example 4 | St | AIBN | | | 95 | 15,400 | 1.5 | B | 3.2 |
| Comparative Example 5 | MMA | | | | 96 | 15,800 | 1.4 | B | 3.7 |
| Comparative Example 6 | St/MMA | | | | 95 | 16,000 | 1.5 | B | 4.1 |

[Note 1] St: Styrene, MMA: Methyl methacrylate
[Note 2] The amount of potassium iodide represents the amount of potassium iodide (mol/L) contained in a second liquid mixture, and represents the content of iodide ion.
[Note 3] In molecular-weight controllability, symbol "A" represents "good", symbol "B" represents "poor" in a case other than the case of "A", and symbol "—" represents that the evaluation could not be conducted.

The method for producing polymer particles according to aspects of the present invention can achieve both satisfactory molecular-weight controllability and a satisfactory polymerization conversion rate. Accordingly, the method can be used for producing, for example, a polymerized toner or a functional binder contained in an ink-jet ink or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-099342 filed Apr. 27, 2011 and No. 2011-250856 filed Nov. 16, 2011, which are hereby incorporated by reference herein in their entirety.

What is claimed is:

1. A method for producing polymer particles, comprising:
   a suspension step of suspending a first liquid mixture containing an oily olefin monomer, a radical polymerization initiator, and an iodine molecule in a second liquid mixture containing water and an iodide ion to prepare a suspension containing an oil droplet comprising the first liquid mixture;
   a synthesis step of synthesizing an iodine compound by allowing a radical generated by cleavage of the radical polymerization initiator to react with the iodine molecule in the oil droplet; and
   a polymerization step of polymerizing the oily olefin monomer in the oil droplet.

2. The method according to claim 1, wherein the radical polymerization initiator is an oil-soluble radical polymerization initiator.

3. The method according to claim 1, wherein the content of the iodide ion in the second liquid mixture is $5 \times 10^{-2}$ mol/L or more and 5 mol/L or less.

4. The method for producing polymer particles according to claim 1,
   the number-average particle diameter of the polymer particles is 20 nm or more and 100 μm or less.

5. The method for producing polymer particles according to claim 1,
   the second liquid mixture further comprising a dispersant.

6. The method for producing polymer particles according to claim 5,
   wherein the dispersant is selected from the group consisting of calcium phosphate, tricalcium phosphate, magnesium phosphate, aluminum phosphate, zinc phosphate, calcium carbonate, magnesium carbonate, calcium metasilicate, calcium sulfate, barium sulfate, calcium hydroxide, magnesium hydroxide, aluminum hydroxide, silica, bentonite, and alumina.

* * * * *